United States Patent
Ohmura et al.

(10) Patent No.: US 10,850,589 B2
(45) Date of Patent: Dec. 1, 2020

(54) STABILIZER AND ASSEMBLING METHOD THEREFOR

(71) Applicant: NHK SPRING CO., LTD., Kanagawa (JP)

(72) Inventors: Shuji Ohmura, Kanagawa (JP); Shigeru Kuroda, Kanagawa (JP)

(73) Assignee: NHK SPRING CO., LTD., Kanagawa (JP)

( * ) Notice: Subject to any disclaimer, the term of this patent is extended or adjusted under 35 U.S.C. 154(b) by 39 days.

(21) Appl. No.: 16/330,354

(22) PCT Filed: Aug. 7, 2017

(86) PCT No.: PCT/JP2017/028546
§ 371 (c)(1),
(2) Date: Mar. 4, 2019

(87) PCT Pub. No.: WO2018/043044
PCT Pub. Date: Mar. 8, 2018

(65) Prior Publication Data
US 2019/0202255 A1 Jul. 4, 2019

(30) Foreign Application Priority Data
Sep. 5, 2016 (JP) .................................. 2016-172571

(51) Int. Cl.
*B60G 21/055* (2006.01)
*F16J 3/04* (2006.01)
(Continued)

(52) U.S. Cl.
CPC ......... *B60G 21/0551* (2013.01); *B60G 7/005* (2013.01); *B60G 21/04* (2013.01);
(Continued)

(58) Field of Classification Search
CPC .... B60G 21/0551; B60G 7/005; B60G 21/04; B60G 21/055; F16J 3/04; F16J 15/52
See application file for complete search history.

(56) References Cited

U.S. PATENT DOCUMENTS 5,954,353 A 9/1999 Kincaid et al.
6,076,840 A 6/2000 Kincaid et al.
(Continued)

FOREIGN PATENT DOCUMENTS

JP H01-182109 A 7/1989
JP H03-34910 U 4/1991
(Continued)

OTHER PUBLICATIONS

Korean Office Action for the related Korean Patent Application No. 10-2019-7009437 dated Mar. 16, 2020.
(Continued)

*Primary Examiner* — Faye M Fleming
(74) *Attorney, Agent, or Firm* — Kenealy Vaidya LLP

(57) ABSTRACT

A stabilizer includes: a stabilizer bar made of a pipe material; and a stabilizer link that couples the stabilizer bar and a suspension device. The stabilizer link includes a ball stud which includes a shaft portion inserted to and fixed in an opening end of the stabilizer bar and a ball portion formed at a leading end of the shaft portion, a housing which rotatably supports the ball portion, and a flexible dust cover which includes one end attached on the housing so as to be unmovable in a ball stud axis direction and the other end attached on at least either of the shaft portion and the stabilizer bar and which seals a space between the housing and the ball stud.

12 Claims, 6 Drawing Sheets

(51) Int. Cl.
  *F16J 15/52* (2006.01)
  *B60G 21/04* (2006.01)
  *B60G 7/00* (2006.01)
(52) U.S. Cl.
  CPC .............. *B60G 21/055* (2013.01); *F16J 3/04* (2013.01); *F16J 15/52* (2013.01); *B60G 2202/135* (2013.01); *B60G 2204/1224* (2013.01); *B60G 2204/416* (2013.01)

(56) References Cited

U.S. PATENT DOCUMENTS

| | | | | |
|---|---|---|---|---|
| 6,648,350 | B1* | 11/2003 | Clements | B21K 1/02 |
| | | | | 280/124.106 |
| 7,004,665 | B2* | 2/2006 | Wasylewski | F16C 11/0638 |
| | | | | 403/122 |
| 7,097,381 | B2* | 8/2006 | Sieve | B60G 7/005 |
| | | | | 403/123 |
| 2019/0077208 | A1* | 3/2019 | Kuroda | F16C 11/068 |
| 2019/0118596 | A1* | 4/2019 | Reddehase | B60G 21/055 |
| 2019/0217679 | A1* | 7/2019 | Kuroda | B60G 21/0551 |
| 2019/0291526 | A1* | 9/2019 | Kuroda | B60G 21/055 |
| 2020/0039317 | A1* | 2/2020 | Kuroda | F16C 11/0685 |

FOREIGN PATENT DOCUMENTS

| | | |
|---|---|---|
| JP | H08-127220 A | 5/1996 |
| JP | 2001-55035 A | 2/2001 |
| JP | 2011-247338 A | 12/2011 |
| WO | 2018/043044 A1 | 3/2018 |

OTHER PUBLICATIONS

International Search Report and Written Opinion of the International Search Report for PCT/JP2017/028546 dated Aug. 29, 2017.

* cited by examiner

STABILIZER AND ASSEMBLING METHOD THEREFOR

CROSS-REFERENCE TO RELATED APPLICATIONS

This application is a U.S. National Stage Application under 35 U.S.C § 371 of International Patent Application No. PCT/JP2017/028546 filed 7 Aug. 2017, which claims the benefit of priority to Japanese Patent Application No. 2016-172571 filed 5 Sep. 2016, the disclosures of all of which are hereby incorporated by reference in their entireties.

TECHNICAL FIELD

The present invention relates to a stabilizer and an assembling method therefor.

BACKGROUND ART

A device disclosed in Patent Literature 1 is a conventional example of a stabilizer. Patent Literature 1 discloses a technique of rotatably housing a ball portion of a ball stud in a socket portion (housing) of a stabilizer link and connecting a shaft portion of the ball stud to an opening end of a stabilizer bar by swaging.

CITATION LIST

Patent Literature

Patent Literature 1: Japanese Patent Application Publication No. H1-182109

SUMMARY OF INVENTION

Technical Problem

Having a configuration in which the housing of the stabilizer link and the shaft portion of the ball stud have a space therebetween, the stabilizer disclosed in Patent Literature 1 a problem of easy entry of water and dust into a ball joint portion.

The present invention is made for solving the above problem and has an object to provide a stabilizer having a simple structure capable of preventing entry of water and dust into a ball joint portion and an assembling method for the stabilizer.

Solution to Problem

To solve the above problems, the present invention is a stabilizer, including: a stabilizer bar made of a pipe material; and a stabilizer link that couples the stabilizer bar and a suspension device, in which the stabilizer link includes a ball stud, which includes a shaft portion inserted to and fixed in an opening end of the stabilizer bar and a ball portion formed at a leading end of the shaft portion, a housing, which rotatably supports the ball portion, and a flexible dust cover, which includes one end attached on the housing so as to be unmovable in a ball stud axis direction and the other end attached on at least either of the shaft portion and the stabilizer bar and which seals a space between the housing and the ball stud.

According to the present invention, it is possible to prevent entry of dust and water into a ball joint portion with a simple structure by the flexible dust cover that seals the space between the housing and the ball stud.

In the present invention, the other end of the dust cover is attached on the shaft portion so as to be unmovable in the ball stud axis direction.

According to the present invention, the configuration in which the other end of the dust cover is attached on the shaft portion allows the shaft portion to be fixed in the opening end of the stabilizer bar in a state where the dust cover is assembled on the housing and the shaft portion in advance.

In the present invention, the other end of the dust cover is attached on the stabilizer bar so as to be unmovable in the ball stud axis direction.

According to the present invention, it is possible to not only prevent entry of water and dust into the ball joint portion but also to prevent entry of water and dust into the space between the stabilizer bar and the shaft portion by the dust cover.

In the present invention, in the dust cover, a portion between the one end and the other end is attached on the shaft portion so as to be unmovable in the ball stud axis direction, and the other end is tightly attached on an outer circumferential surface of the stabilizer bar.

According to the present invention, it is possible to prevent entry of water and dust into the ball joint portion by the dust cover, and also it is possible to prevent entry of water and dust into the space between the stabilizer bar and the shaft portion by a cover portion.

In the present invention a terminal end of the shaft portion is provided with a taper surface having a conical shape about a ball stud axis with a greater diameter than an inner diameter of the opening end of the stabilizer bar, and the shaft portion is fixed on the stabilizer bar by welding with the taper surface thrusted on the opening end of the stabilizer bar.

According to the present invention, the taper surface enables easy centering of the ball stud and the stabilizer bar, and the ball stud and the stabilizer bar can be coupled using a simple welding configuration.

In the present invention, the shaft portion is fixed on the stabilizer bar by press-fitting with a collar interposed therebetween.

According to the present invention, although a diameter of the stabilizer bar has variations depending on specifications of a vehicle, it is possible to easily obtain the dimension appropriate for the press-fitting without changing the specifications of the shaft portion by preparing multiple sizes of collars.

The present invention is a method for assembling a stabilizer including a stabilizer bar made of a pipe material and a stabilizer link that couples the stabilizer bar and a suspension device, in which the stabilizer link includes a ball stud, which includes a shaft portion inserted to and fixed in an opening end of the stabilizer bar and a ball portion formed at a leading end of the shaft portion, a housing, which rotatably supports the ball portion, and a flexible dust cover which includes one end attached on the housing so as to be unmovable in a ball stud axis direction and the other end attached on the stabilizer bar, and which seals a space between the housing and the ball stud, the method including: fixing the shaft portion and the stabilizer bar to each other in a state where the dust cover is folded to temporarily bring the other end of the dust cover close to the housing; and thereafter tightly attaching the other end of the dust cover on an outer circumferential surface of the stabilizer bar.

According to the present invention, with a simple assembling method, it is possible to prevent entry of water and dust into the ball joint portion by the dust cover, and also it is possible to prevent entry of water and dust into the space between the stabilizer bar and the shaft portion by a cover portion.

Advantageous Effects of Invention

According to the present invention, it is possible to prevent entry of water and dust into a ball joint portion using a simple structure.

DESCRIPTION OF EMBODIMENTS

Figure 1:
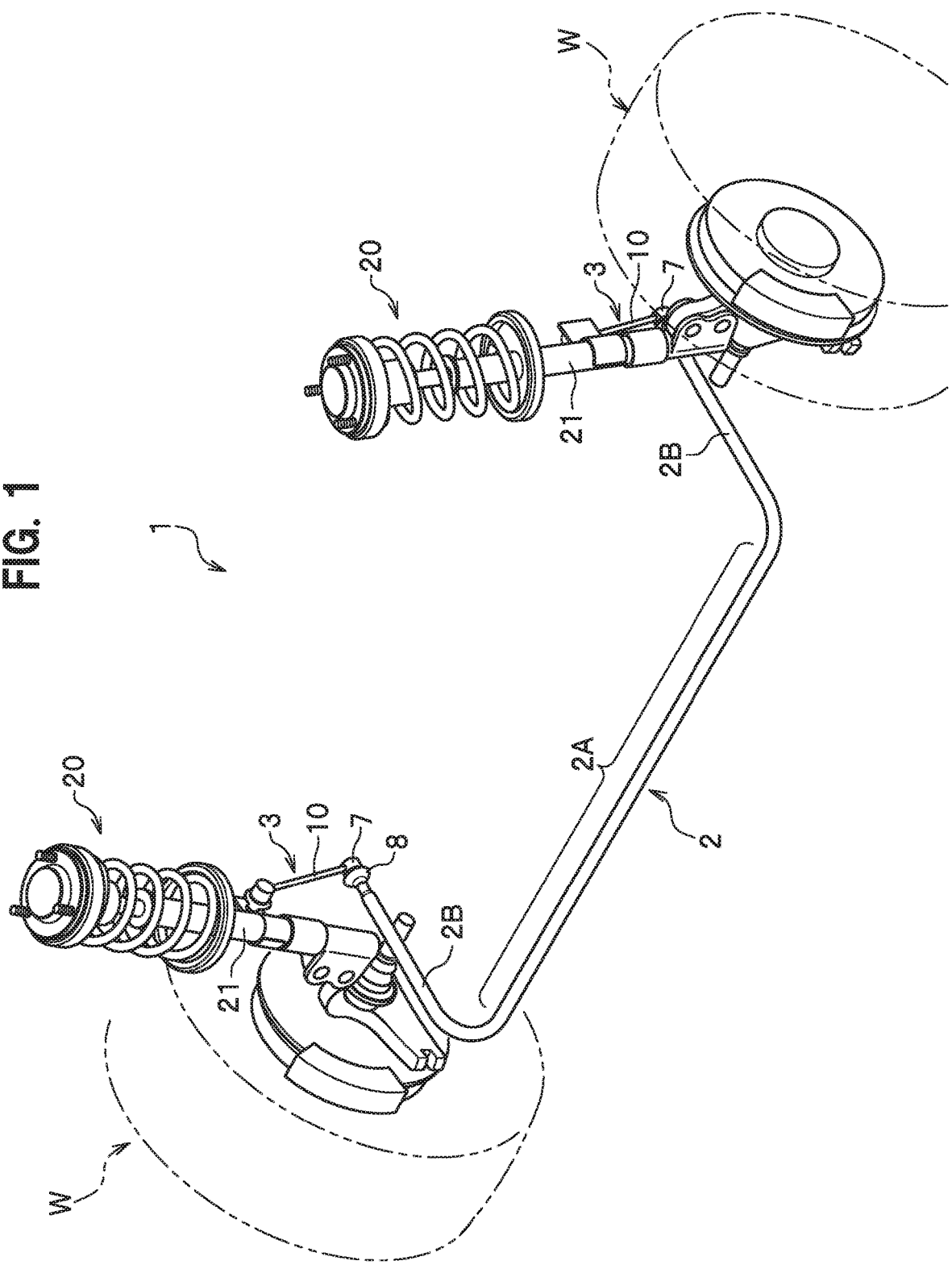
FIG. 1 is an exterior perspective view of a stabilizer.

As illustrated in FIG. 1, a stabilizer 1 includes a stabilizer bar 2 and a right-and-left-pair of stabilizer links 3. The stabilizer 1 suppresses rolling of the vehicle using the elastic resilience of wind and torsion that occur due to the difference of displacement between right and left shock absorbers 21 during turning and the like of a vehicle.

The stabilizer bar 2 is made of a pipe material such as a steel pipe and includes a torsion portion 2A extending in a vehicle width (right and left) direction and a right-and-left-pair of arm portions 2B extending in a substantial front and rear direction from two ends of the torsion portion 2A forming a substantial square U-shape in planar view.

Figure 2:
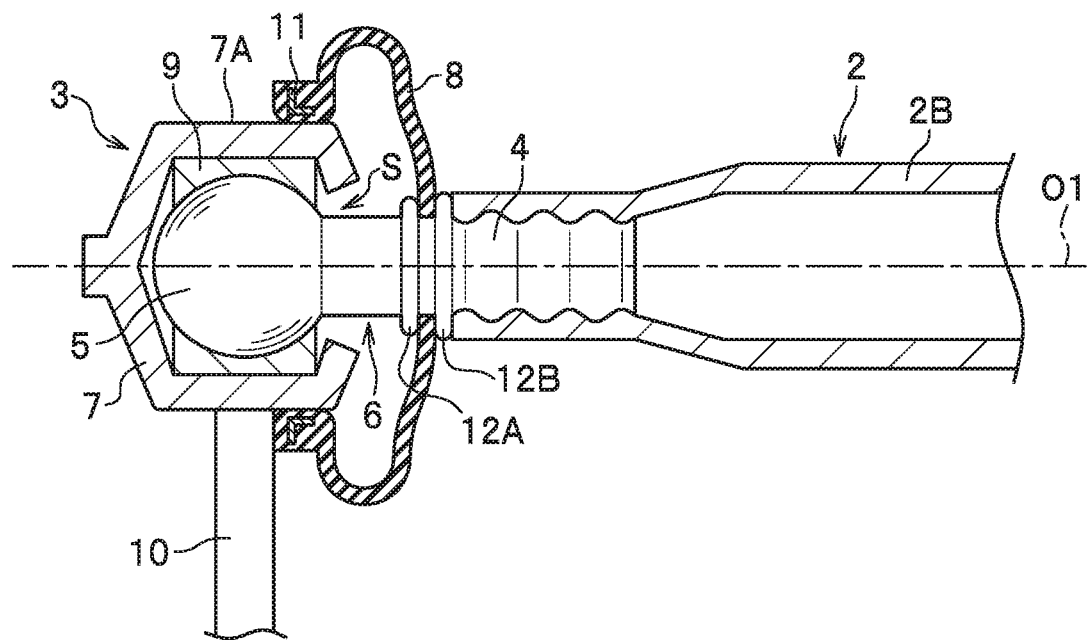
FIG. 2 is a cross-sectional view of a stabilizer according to a first embodiment.

Each stabilizer link 3 couples an end of the arm portion 2B and the shock absorber 21 of a corresponding suspension device as a vehicle side member for supporting a wheel W. As illustrated in FIG. 2, the stabilizer link 3 includes a ball stud 6 which includes a shaft portion 4 inserted to and fixed in an opening end of the stabilizer bar 2 and a ball portion 5 formed at a leading end of the shaft portion 4, a housing 7 which rotatably supports the ball portion 5 in the universal direction, and a flexible dust cover 8 which includes one end attached on an outer surface of the housing 7 so as to be unmovable in a ball stud axis O1 direction and the other end attached on at least either of the shaft portion 4 and the stabilizer bar 2 and which seals a space S between the housing 7 and the ball stud 6.

The housing 7 is a member having a substantial cylinder shape including an opening at one end side, and the housing 7 supports the ball portion 5 of the ball stud 6 inserted from the opening rotatably in the universal direction using a ball seat 9 as a spherical bearing. The housing 7 and the ball stud 6 are made of metal, for example, and the ball seat 9 is made of synthetic resin material, for example. The housing 7 may be a fiber reinforcing resin material and the like. One end of a coupling bar 10 extending in a direction substantially orthogonal to the ball stud axis O1 direction is fixed on the outer surface of the housing 7, and the other end side of the coupling bar 10 is also provided with the similar housing 7 and ball stud 6. The ball stud 6 on the other end side of the coupling bar 10 is attached to the shock absorber 21 (FIG. 1).

First Embodiment

As illustrated in FIG. 2, the one end of the dust cover 8 is attached on an outer circumferential surface 7A of the housing 7 using a ring member 11 so as to be unmovable in the ball stud axis O1 direction. The dust cover 8 is a member provided with openings on the one end side and the other end side and including a circumferential wall portion bulging in a radially outward direction in order for the dust cover 8 to be flexible, and is made of flexible material such as rubber material. The ring member 11 made of metal material has, for example, an L-shaped section, and is buried in the end of the dust cover 8 by insert molding and the like. The dust cover 8 is attached on the housing 7 so as to be unmovable in the ball stud axis O1 direction by press-fitting the outer circumferential surface 7A of the housing 7 into the one end in which the ring member 11 is buried.

Figure 3:
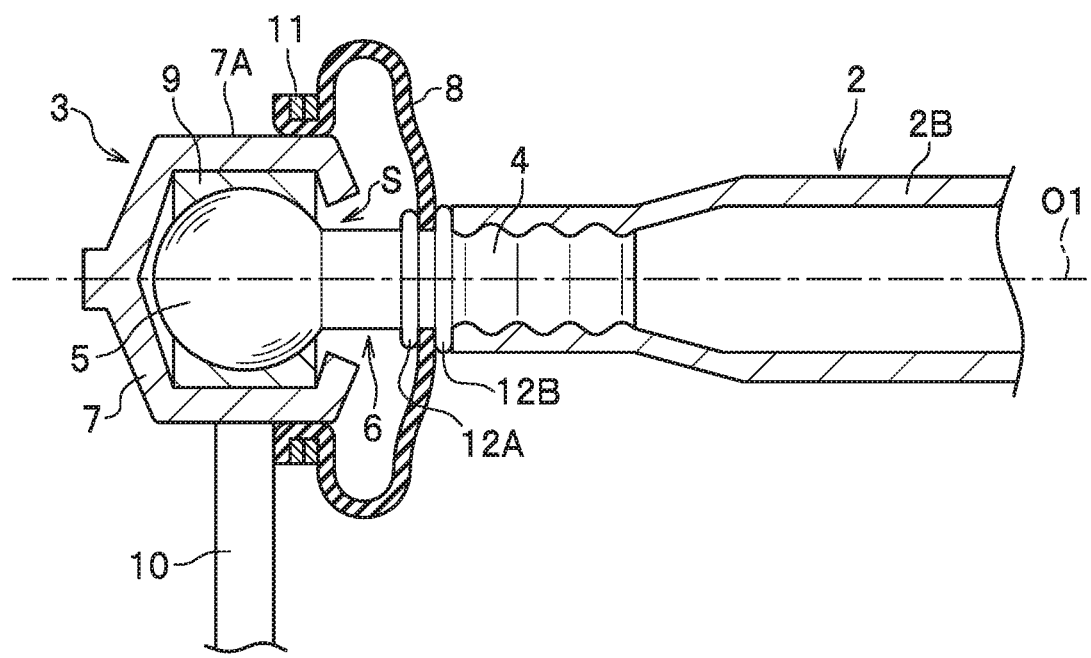
FIG. 3 is a cross-sectional view of a modification of the stabilizer according to the first embodiment.

The ring member 11 may be provided separately from the dust cover 8. FIG. 3 illustrates an aspect in which the one end of the dust cover 8 is provided with a groove, and two windings of coils as the ring member 11 having a rectangular section is fit in the groove. In this aspect, the diameter of the ring member 11 is temporarily expanded to allow the one end of the dust cover 8 to be fitted onto the outer circumferential surface 7A of the housing 7, and the elastic resilience that encourages reduction of the diameter of the ring member 11 allows the dust cover 8 to be attached on the housing 7 so as to be unmovable in the ball stud axis O1 direction.

An outer circumferential surface of the shaft portion 4 of the ball stud 6 is provided with two pieces of flanges 12A and 12B, and the other end of the dust cover 8 is attached on the shaft portion 4 so as to be unmovable in the ball stud axis O1 direction by being tightly attached on the outer circumferential surface of the shaft portion 4 so as to be clamped by the flanges 12A and 12B. A recess may be provided to form a groove on the outer circumferential surface of the shaft portion 4 so as to fit the other end of the dust cover 8 in the groove.

The shaft portion 4 of the ball stud 6 is integrally coupled with the stabilizer bar 2 by being inserted to the opening end of the stabilizer bar 2 and swaged by a circumferential wall portion of the stabilizer bar 2 using a pressing machine and the like (the circumferential wall portion is plastically deformed). The outer circumferential surface of the shaft portion 4 is provided with bumpy portions into which an inner circumferential surface of the stabilizer bar 2 is dug. The bumpy portions may be multiple wavy bumps formed in the ball stud axis O1 direction as illustrated in FIGS. 2 and 3, knurling patterns of straight lines or crossed lines, and the like.

Operations

The flexible dust cover 8, which includes the one end attached on the housing 7 so as to be unmovable in the ball stud axis O1 direction and seals the space S between the housing 7 and the ball stud 6, prevents entry of water and dust into the periphery of the ball portion 5 or the ball joint portion. The configuration for attaching the dust cover 8 on the housing 7, which is the configuration in which the one end of the dust cover 8 is fitted onto the outer peripheral surface 7 of the housing 7 by using the metallic ring member 11, enables quick assembling of the dust cover 8 on the housing 7.

The configuration in which the other end of the dust cover 8 is attached on the shaft portion 5 so as to be unmovable in the ball stud axis O1 direction allows the shaft portion 5 to be fixed in the opening end of the stabilizer bar 2 in a state where the dust cover 8 is assembled on the housing 7 and the shaft portion 5 in advance. The configuration in which the other end of the dust cover 8 is clamped by the two flanges 12A and 12B enables quick assembling of the dust cover 8 on the shaft portion 5.

The entry of water and dust into the opening end of the stabilizer bar 2 is prevented by swaging the circumference of the opening end on the outer circumferential surface of the ball stud 6. In specific, the entry of water and dust can be reliably prevented with a labyrinth configuration of the bumpy portions created by forming the multiple bumps in the ball stud axis O1 direction or the knurling patterns on the outer peripheral surface of the ball stud 6.

Second Embodiment

Figure 4:
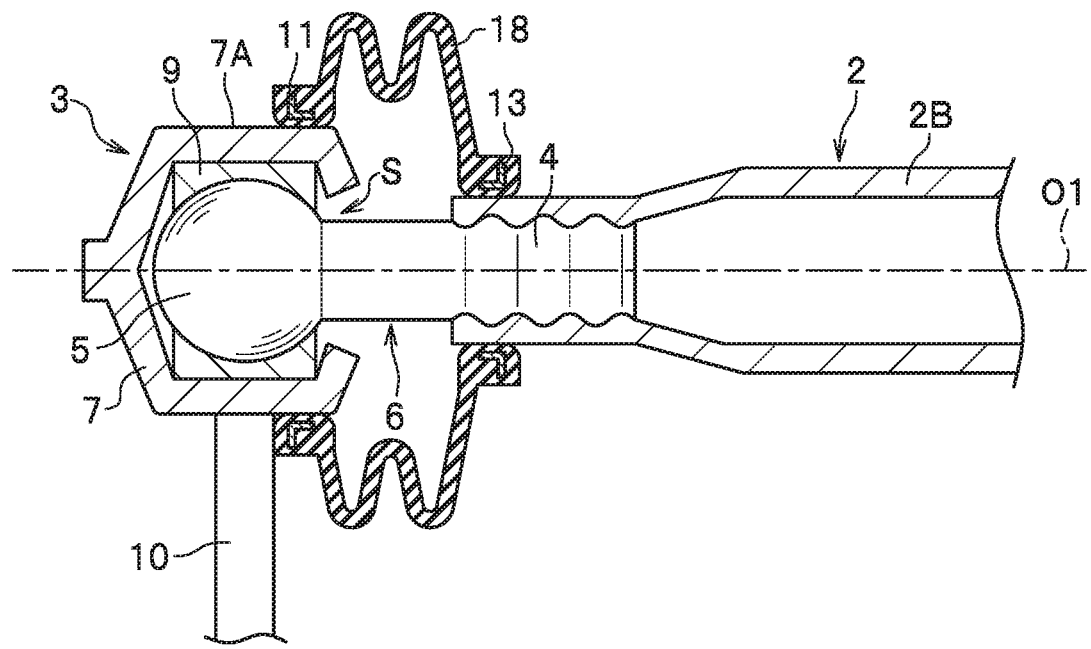
FIG. 4 is a cross-sectional view of a stabilizer according to a second embodiment.

In FIG. 4, the other end of a dust cover 18 according to a second embodiment is attached on the stabilizer bar 2 so as to be unmovable in the ball stud axis O1 direction. For example, like the one end side, a metallic ring member 13 is buried in the other end of the dust cover 18. The dust cover 18 is attached on the stabilizer bar 2 so as to be unmovable in the ball stud axis O1 direction by press-fitting the outer circumferential surface of the stabilizer bar 2 into the other end in which the ring member 13 is buried. The ring member 11 may be provided separately from the dust cover 18. The outer circumferential surface of the stabilizer bar 2 may be provided with a groove and the like, and the other end of the dust cover 18 may be fitted in the groove. Like the first embodiment, the shaft portion 4 of the ball stud 6 is integrally coupled with the stabilizer bar 2 by being inserted to the opening end of the stabilizer bar 2 and swaged by the circumferential wall portion of the stabilizer bar 2 using the pressing machine and the like.

During the swaging, the shaft portion 4 and the stabilizer bar 2 are swaged and fixed with each other in a state where the dust cover 18 is folded to temporarily bring the other end of the dust cover 18 close to the housing 7 so as not to interfere with the pressing machine. Thereafter, the other end of the dust cover 18 is tightly attached on the outer circumferential surface of the stabilizer bar 2 by the ring member 11.

In the case of this embodiment, since the dust cover 18 is bridged over the housing 7 and the stabilizer bar 2, the length of the dust cover 18 in the both stud axis O1 direction is long. In such a case, the dust cover 18 may have a bellows shape to enhance its capability of following the movement of the ball joint.

According to this embodiment, it is possible to not only prevent entry of water and dust into the ball joint portion but also to prevent entry of water and dust into the space between the stabilizer bar 2 and the shaft portion 4 by the dust cover 18.

Third Embodiment

Figure 5:
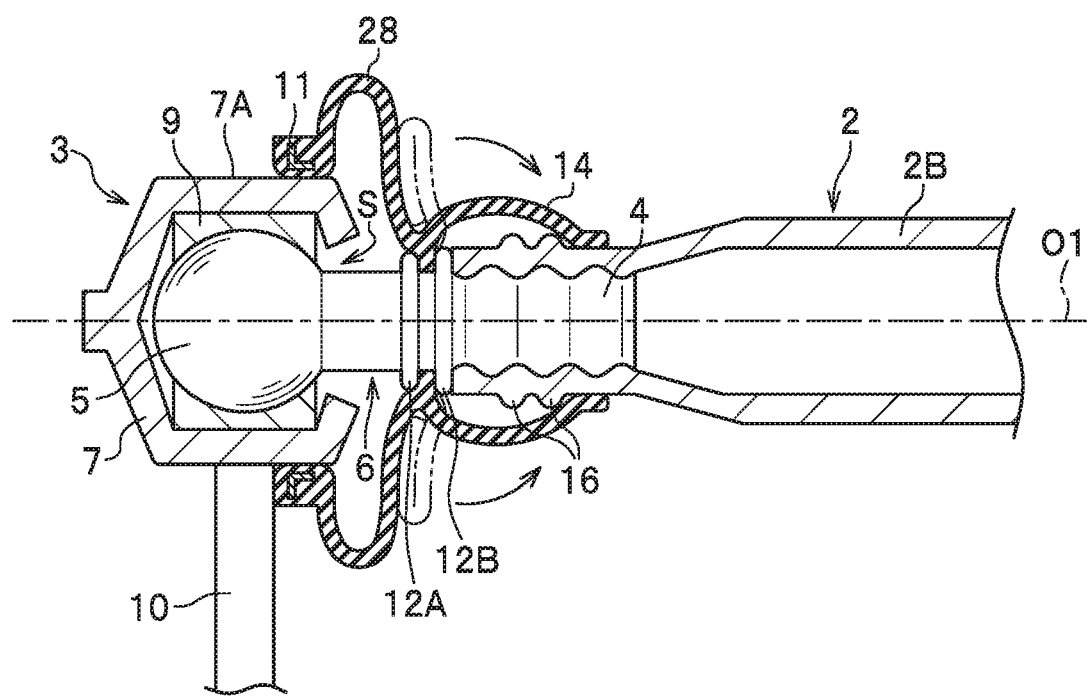
FIG. 5 is a cross-sectional view of a stabilizer according to a third embodiment.

In FIG. 5, in a dust cover 28 according to a third embodiment, a portion between one end and the other end is attached on the shaft portion 4 so as to be unmovable in the ball stud axis O1 direction, and the other end is tightly attached on the outer circumferential surface of the stabilizer bar 2. The portion between the one end and the other end of the dust cover 28 is attached on the shaft portion 4 so as to be unmovable in the ball stud axis O1 direction by, for example, being clamped by the flanges 12A and 12B. In the dust cover 28, an area between the portion attached on the shaft portion 4 and the other end is a cover portion 14.

Like the first embodiment, the shaft portion 4 of the ball stud 6 is integrally coupled with the stabilizer bar 2 by being inserted to the opening end of the stabilizer bar 2 and swaged by the circumferential wall portion of the stabilizer bar 2 using the pressing machine and the like. During the swaging, the shaft portion 4 and the stabilizer bar 2 are swaged and fixed with each other in a state where the cover portion 14 is folded back as illustrated by virtual lines to be temporarily brought close to the housing 7 so as not to interfere with the pressing machine. Thereafter, the cover portion 14 is rolled down as indicated by arrows, and the other end of the cover portion 14 is tightly attached on the outer circumferential surface of the stabilizer bar 2. If a shifting stopper 16 having a protrusion shape or a recess shape is formed on the outer circumferential surface of the stabilizer bar 2 by the pressing machine at the same time during the swaging, it is possible to suppress shifting of the other end of the cover portion 14 by the shifting stopper 16.

According to this embodiment, it is possible to prevent entry of water and dust into the ball joint portion by the dust cover 28, and also it is possible to prevent entry of water and dust into the space between the stabilizer bar 2 and the shaft portion 4 by the cover portion 14. Since the other end side of the cover portion 14 is hardly affected by the movement of the ball joint portion, shifting of the stabilizer bar 2 on the outer circumferential surface is also hardly generated, and thus the initial tight attachment is maintained.

Figure 6:
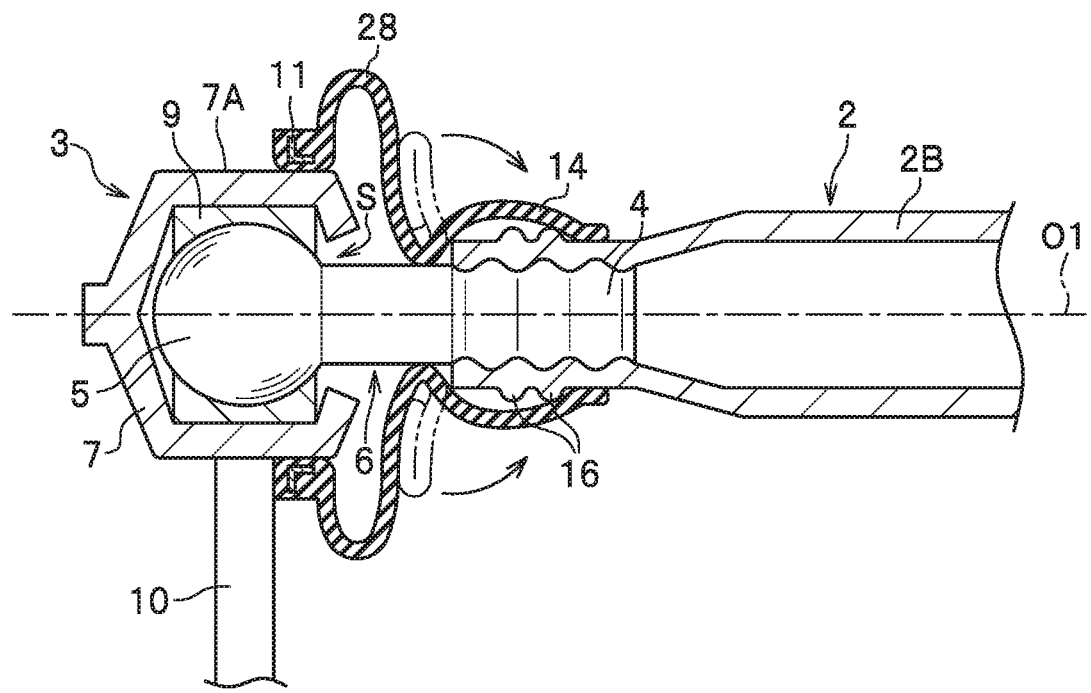
FIG. 6 is a cross-sectional view of a stabilizer according to a modification of the third embodiment.

FIG. 6 illustrates a modification of the third embodiment. In FIG. 5, the portion between the one end and the other end of the dust cover 28 is clamped by the flanges 12A and 12B of the shaft portion; however, in FIG. 6, the portion between the one end and the other end of the dust cover 28 is simply tightly attached on the outer circumferential surface of the shaft portion 4. Like the case of FIG. 5, the cover portion 14 is folded back as illustrated by virtual lines to be temporarily brought close to the housing 7 so as not to interfere with the pressing machine during the swaging, and after the swaging of the shaft portion 4 and the stabilizer bar 2 is completed, the cover portion 14 is rolled down as indicated by arrows, and the other end of the cover portion 14 is tightly attached on the outer circumferential surface of the stabilizer bar 2. If the shifting stopper 16 is formed on the outer circumferential surface of the stabilizer bar 2, it is possible to suppress shifting of the other end of the cover portion 14 by the shifting stopper 16.

According to this modification, it is possible to prevent entry of water and dust into the ball joint portion by the dust cover 28, and also it is possible to prevent entry of water and dust into the space between the stabilizer bar 2 and the shaft portion 4 by the cover portion 14 as well. Since the other end side of the cover portion 14 is hardly affected by the movement of the ball joint portion, shifting of the stabilizer bar 2 on the outer circumferential surface is also hardly generated, and thus the initial tight attachment is maintained.

In this modification, although there is no movement restriction by the flanges 12A and 12B, the tight attachment is enhanced by appropriately setting the diameter dimension of a portion of the dust cover 28 with which the shaft portion 4 is tightly attached. As long as the sealing function of the other end side of the cover member 14 is maintained, shifting on the shaft portion 4 does not become a big problem.

Figure 7:
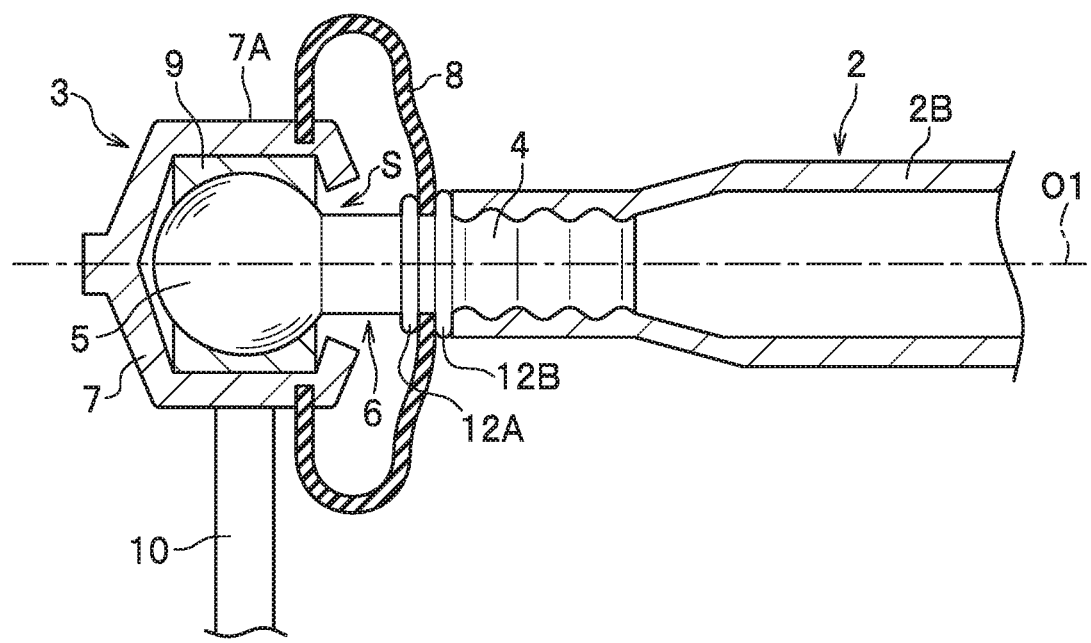
FIG. 7 is a cross-sectional view that illustrates a first modification of attaching a dust cover on a housing.

Hereinbefore, the preferable embodiments for attaching the dust cover 8 are described. In the above embodiments, the one end of the dust cover 8 is attached on the outer circumferential surface 7A of the housing 7 using the ring member 11; however, as illustrated in FIG. 7, the outer circumferential surface 7A of the housing 7 may be provided with a groove, and the one end of the dust cover 8 may be fitted in the groove.

Figure 8:
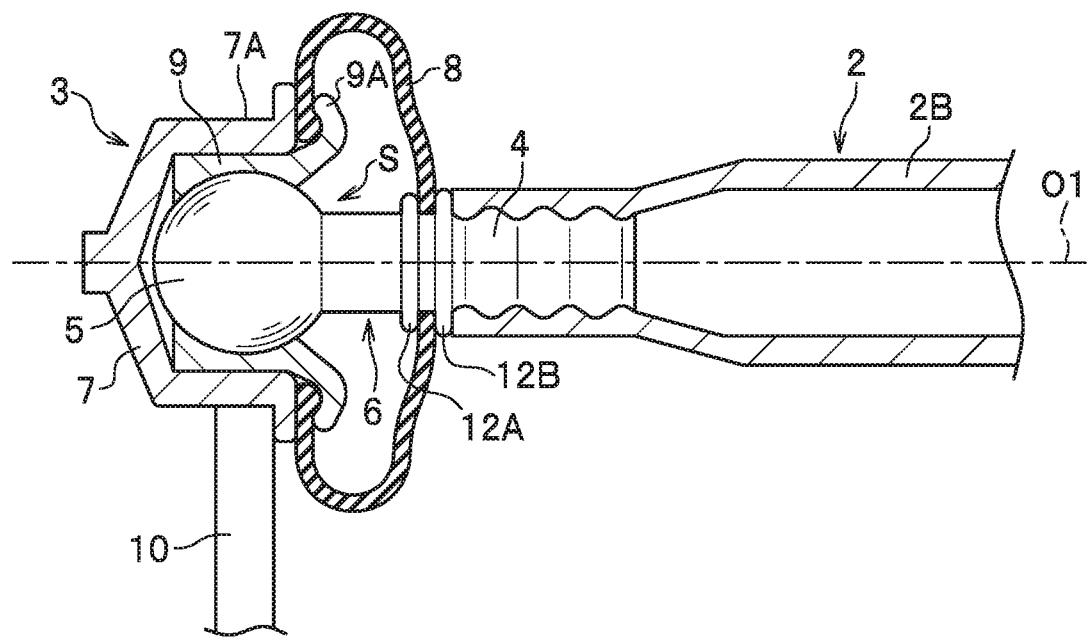
FIG. 8 is a cross-sectional view that illustrates a second modification of attaching the dust cover on the housing.

In addition, as illustrated in FIG. 8, an edge portion 9A of the ball seat 9 may be arranged outside the housing 7 to make a configuration in which the one end of the dust cover 8 is clamped by the edge portion 9A and an opening edge portion of the housing 7.

Figure 9:
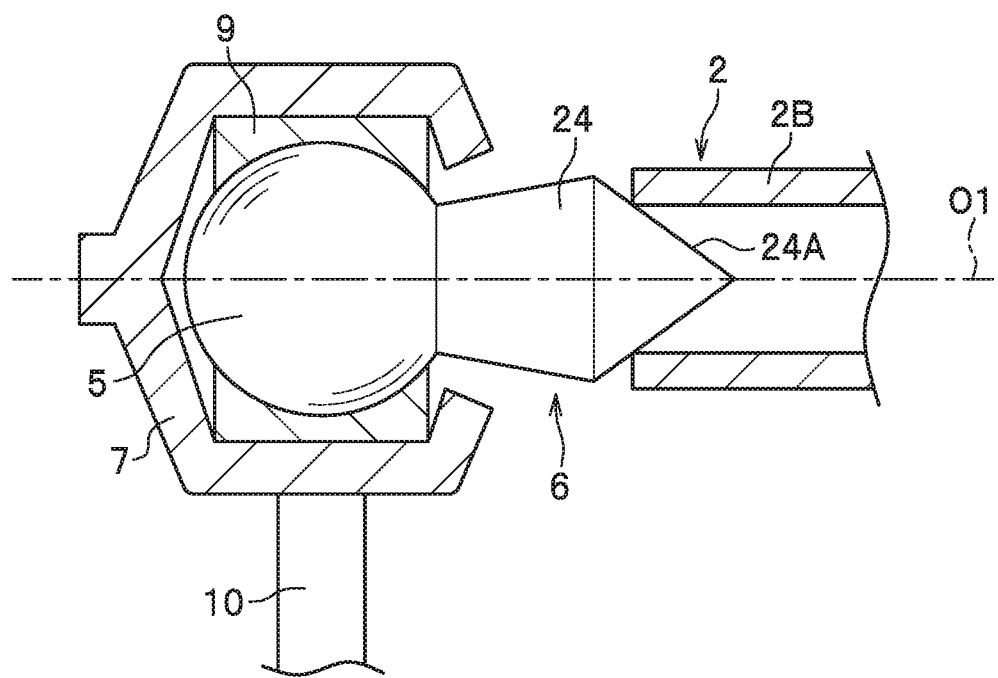
FIG. 9 is a cross-sectional view of a case in which a ball stud and a stabilizer bar are coupled with each other by welding.

A configuration made by other than the swaging may be applied for ensuring the water-tightness between the shaft portion 4 of the ball stud 6 and the stabilizer bar 2. FIG. 9 illustrates a configuration in which a terminal end of a shaft portion 24 is provided with a taper surface 24A having a conical shape about the ball stud axis O1 with a greater diameter than an inner diameter of the opening end of the stabilizer bar 2, the taper surface 24A is thrusted on the opening end of the stabilizer bar 2, and the thrusted portion is welded. Since the taper surface 24A is formed about the ball stud axis O1, the centering of the shaft portion 24 and the stabilizer bar 2 is made by only the thrust. The welding may be, for example, welding, resistance welding, TIG welding, or the like.

Figure 10:
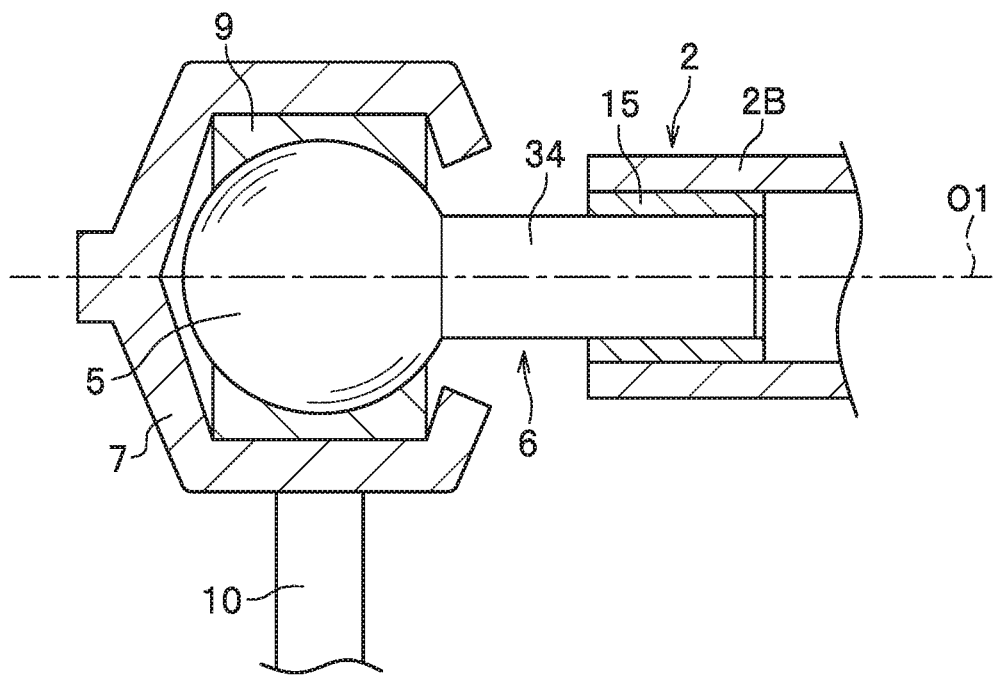
FIG. 10 is a cross-sectional view of a case in which the ball stud and the stabilizer bar are coupled with each other by press-fitting with a collar interposed therebetween.

The water-tightness may be ensured by inserting the shaft portion 4 to the opening end of the stabilizer bar 2 by press-fitting. Since the diameter of the stabilizer bar 2 may have various sizes depending on the specifications of the vehicle, if a configuration in which a collar 15 is interposed between a shaft portion 34 and the stabilizer bar 2 as illustrated in FIG. 10 is applied and multiple sizes of the collars 15 are prepared, it is possible to easily obtain the dimension appropriate for the press-fitting without changing the specifications of the shaft portion 34. The collar 15 is inserted to the opening end of the stabilizer bar 2 by press-fitting in a state where, for example, being fitted onto the shaft portion 34 by the press-fitting.

Otherwise, the water-tightness may be ensured by connecting the outer circumferential surface of the shaft portion 4 and the inner circumferential surface of the stabilizer bar 2 by an adhesive.

REFERENCE SIGNS LIST 1 stabilizer
2 stabilizer bar
3 stabilizer link
4, 24, 34 shaft portion
5 ball portion
7 housing
8, 18, 28 dust cover
11, 13 ring member
14 cover member
15 collar

What is claimed is:

1. A stabilizer, comprising:
a stabilizer bar made of a pipe material; and
a stabilizer link that couples the stabilizer bar and a suspension device, wherein
the stabilizer link includes
a ball stud which includes a shaft portion inserted to and fixed in an opening end of the stabilizer bar and a ball portion formed at a leading end of the shaft portion,
a housing which rotatably supports the ball portion, and
a flexible dust cover which includes one end attached on the housing so as to be unmovable in a ball stud axis direction and another end attached on at least either of the shaft portion and the stabilizer bar, and which seals a space between the housing and the ball stud, wherein
the other end of the dust cover is attached on the stabilizer bar so as to be unmovable in the ball stud axis direction.

2. The stabilizer according to claim 1, wherein
the other end of the dust cover is attached on the shaft portion so as to be unmovable in the ball stud axis direction.

3. The stabilizer according to claim 2, wherein
a terminal end of the shaft portion is provided with a taper surface having a conical shape about a ball stud axis with a greater diameter than an inner diameter of the opening end of the stabilizer bar, and
the shaft portion is fixed on the stabilizer bar by welding with the taper surface thrusted on the opening end of the stabilizer bar.

4. The stabilizer according to claim 2, wherein
the shaft portion is fixed on the stabilizer bar by press-fitting with a collar interposed therebetween.

5. The stabilizer according to claim 1, wherein
in the dust cover, a portion between the one end and the other end is attached on the shaft portion so as to be unmovable in the ball stud axis direction, and the other end is tightly attached on an outer circumferential surface of the stabilizer bar.

6. The stabilizer according to claim 5, wherein
a terminal end of the shaft portion is provided with a taper surface having a conical shape about a ball stud axis with a greater diameter than an inner diameter of the opening end of the stabilizer bar, and
the shaft portion is fixed on the stabilizer bar by welding with the taper surface thrusted on the opening end of the stabilizer bar.

7. The stabilizer according to claim 5, wherein
the shaft portion is fixed on the stabilizer bar by press-fitting with a collar interposed therebetween.

8. The stabilizer according to claim 1, wherein
a terminal end of the shaft portion is provided with a taper surface having a conical shape about a ball stud axis with a greater diameter than an inner diameter of the opening end of the stabilizer bar, and
the shaft portion is fixed on the stabilizer bar by welding with the taper surface thrusted on the opening end of the stabilizer bar.

9. The stabilizer according to claim 1, wherein
the shaft portion is fixed on the stabilizer bar by press-fitting with a collar interposed therebetween.

10. The stabilizer according to claim 1, wherein
a terminal end of the shaft portion is provided with a taper surface having a conical shape about a ball stud axis with a greater diameter than an inner diameter of the opening end of the stabilizer bar, and the shaft portion is fixed on the stabilizer bar by welding with the taper surface thrusted on the opening end of the stabilizer bar.

11. The stabilizer according claim 1, wherein the shaft portion is fixed on the stabilizer bar by press-fitting with a collar interposed therebetween.

12. A method for assembling a stabilizer including a stabilizer bar made of a pipe material and a stabilizer link that couples the stabilizer bar and a suspension device, wherein the stabilizer link includes a ball stud which includes a shaft portion inserted to and fixed in an opening end of the stabilizer bar and a ball portion formed at a leading end of the shaft portion, a housing which rotatably supports the ball portion, and a flexible dust cover which includes one end attached on the housing so as to be unmovable in a ball stud axis direction and another end attached on the stabilizer bar, and which seals a space between the housing and the ball stud, the method comprising:

fixing the shaft portion and the stabilizer bar to each other in a state where the dust cover is folded to temporarily bring the other end of the dust cover close to the housing; and thereafter tightly attaching the other end of the dust cover on an outer circumferential surface of the stabilizer bar.

* * * * *